United States Patent [19]
Drake et al.

[11] 4,155,976
[45] May 22, 1979

[54] APPARATUS AND METHOD FOR STORING MOLTEN MATERIALS

[75] Inventors: Larry L. Drake, Downey; Richard M. Smirnoff, Redondo Beach, both of Calif.

[73] Assignee: Atlantic Richfield Company, Philadelphia, Pa.

[21] Appl. No.: 855,507

[22] Filed: Nov. 28, 1977

[51] Int. Cl.² .............................................. B01J 1/18
[52] U.S. Cl. ..................................... 422/41; 422/112; 141/1; 266/89
[58] Field of Search ................. 141/192–229, 141/6–12; 73/4 R; 422/41, 112, 62; 35/62, 18 R, 19 R; 222/57; 266/80, 89, 90; 23/238, 253 A

[56] References Cited
U.S. PATENT DOCUMENTS

| | | | |
|---|---|---|---|
| 2,549,674 | 4/1951 | Denham | 141/192 |
| 2,747,783 | 5/1956 | Woolbridge | 141/192 |

FOREIGN PATENT DOCUMENTS 1214185  4/1966  Fed. Rep. of Germany ........... 141/192

*Primary Examiner*—Houston S. Bell, Jr.
*Attorney, Agent, or Firm*—Frank J. Uxa

[57] ABSTRACT

An apparatus for storing molten materials comprising a storage tank; inlet and outlet means associated with the storage tank to provide access and egress for the molten material; steam supply means for providing steam to the storage tank; vapor removal means providing for exit of vapor from the vapor space of the storage tank; a liquid powered eductor in fluid communication with the vapor removal means acting to urge vapors from the storage tank through the vapor removal means; and a liquid supply means associated with the eductor to provide liquid to operate the eductor, the amount of liquid supplied being controlled in response to the vapor pressure within the storage tank.

An improved method for storing molten materials is also disclosed.

14 Claims, 1 Drawing Figure

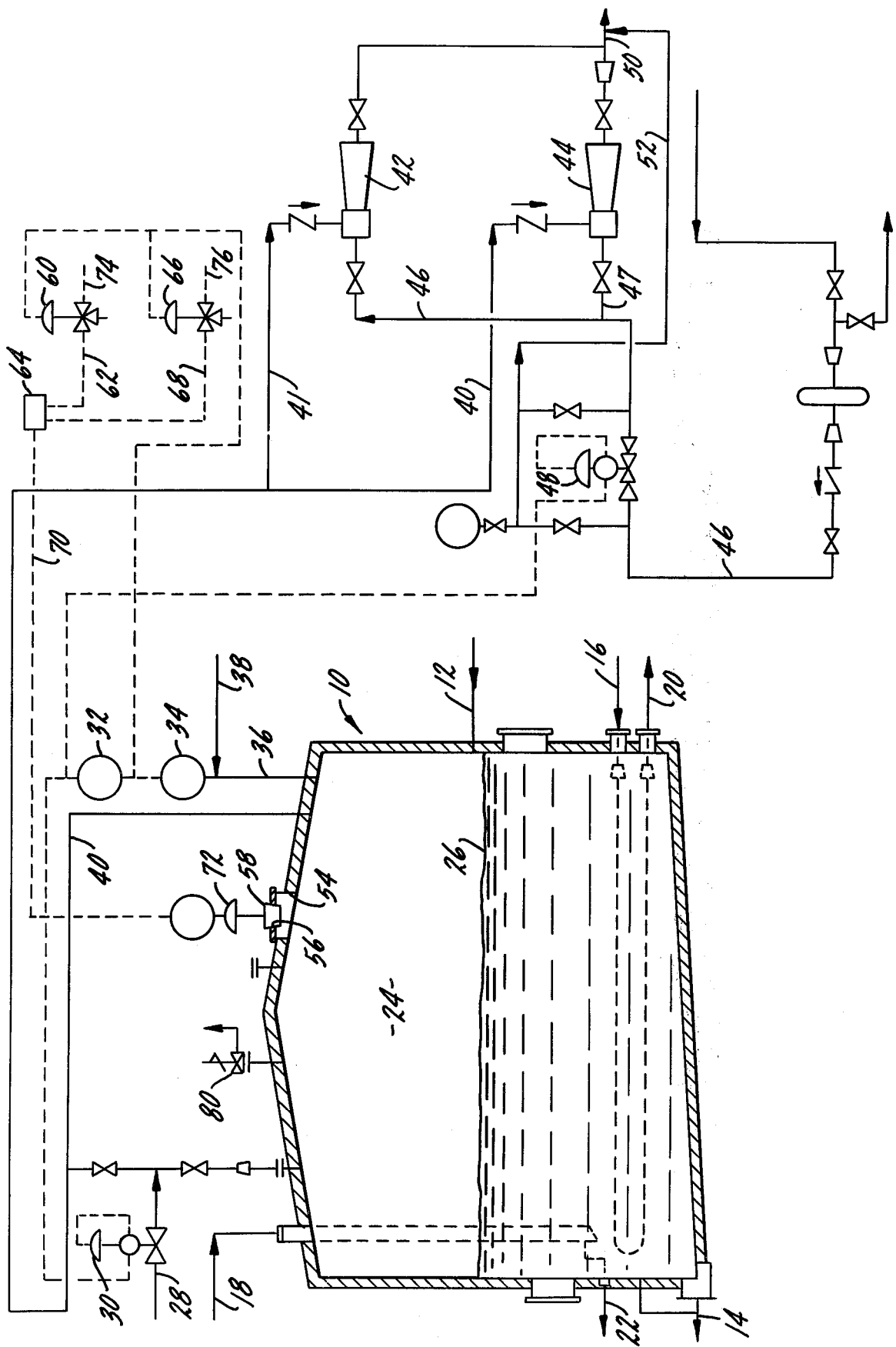

APPARATUS AND METHOD FOR STORING MOLTEN MATERIALS

This invention relates to an improved apparatus and method for storing molten materials. More particularly, this invention relates to an improved apparatus and method for storing molten material, such as sulfur and the like, in storage tanks which are blanketed with steam.

The storage of molten material, such as sulfur and the like, is important in the process industry. Sulfur is an important and valuable product and often requires storage. Special precautions need to be taken in storing molten sulfur, for example, in a storage tank. The crystallization or melting point of molten sulfur is such that it requires constant heating to maintain it in a molten state. Conventionally, such molten sulfur has been heated while in storage through the use of steam. For example, steam coils have been placed in the storage tank to provide heat to the molten sulfur to insure against crystallization. Another use of steam to provide heat to molten sulfur involves a steam blanket over the stored molten sulfur. Such steam blanket further acts to inhibit loss of heat from the molten sulfur.

In the past, there have been no regulations regarding the loss of the sulfur-containing steam from the steam blanket so that steam could continuously be added to the steam blanket to insure the proper heat input to the tank. However, in the recent past, air pollution control has made it imperative that a control system be designed to minimize the amount of sulfur-containing steam vapor which is vented to the atmosphere. One system which has been used involves using water powered eductors to draw the sulfur-containing steam vapor from the storage tank. A control valve in the vapor line is used to regulate the amount of vapor leaving the storage tank. One disadvantage of such a system is that the control valve in the vapor line leaving the storage tank must be heavily insulated in order to avoid crystallization of sulfur and resulting immobility of the valving system. Even with such heavy insulation or steam tracing or both, the valve in the vapor line often becomes plugged with crystallized sulfur thereby rendering the control system inoperative. When this occurs, the pressure relief valve on the tank is forced open to relieve the excessive vapor pressure in the storage tank. Experience has shown that the large pressure relief valves used on most sulfur storage tanks are constructed so that once having been opened to relieve excessive pressure, they do not seat properly unless they are thoroughly cleaned of crystallized sulfur. This is a troublesome maintenance problem and causes much distress. Clearly, it would be advantageous to provide an improved apparatus for storing molten sulfur so that more efficient and easy control of vapor from the storage tank is obtained.

Therefore, one object of the present invention is to provide an improved apparatus and method for storing molten materials, such as sulfur.

Another object of the present invention is to provide an improved apparatus and method for controlling the vapor pressure inside a storage tank for molten material, such as sulfur, wherein gaseous material, such as steam, is added to the storage tank to provide a blanket for the molten sulfur.

A still further object of the present invention is to provide an improved apparatus and method for reducing the amount of sulfur emissions from a molten sulfur storage tank. Other objects and advantages of the present invention will become apparent hereinafter.

An improved apparatus for storing molten (e.g., liquid having a crystallization temperature above the ambient temperature) material, such as sulfur, has now been discovered. This apparatus comprises a storage tank means for storing an amount of molten material, the storage tank means having a vapor space above the level of molten material; inlet and outlet means associated with the storage tank means to provide for access and egress of the molten material to and from the tank means, respectively; steam supply means for providing gaseous media, e.g., steam, to the storage tank means, the amount of gaseous media, e.g., steam, which is supplied being dependent on the vapor pressure within the storage tank means; vapor removal means providing for exit of vapor from the vapor space of the storage tank means; a liquid powered eductor means in fluid communication with the vapor removal means acting to urge the vapors from the storage tank means through the vapor removal means; and a liquid supply means associated with the eductor means to provide liquor to power the eductor means, the amount of liquid being supplied by this source being controlled in response to the vapor pressure inside the storage tank means. In this embodiment, the problem with the prior art apparatus of having molten material, e.g., sulfur, crystallize out in the vicinity of the control valve in the vapor recovery line is prevented because no control valve is necessary in such line. The amount of vapor leaving the storage tank is controlled by regulating the amount of liquid sent to the eductor means. Thus, for example, when a reduced amount of vapor is desired to be removed from the storage tank, the amount of liquid added or sent to the eductor means is reduced thereby reducing the amount of suction created in the eductor and, in turn, reducing the amount of vapor drawn from the storage tank means. On the other hand, when more vapor is required or desired to be removed from the storage tank means, the liquid rate to the eductor is increased thereby causing more suction and more vapor to be drawn from the storage tank means. One additional feature of the present invention especially applicable when the molten material is sulfur is that as the sulfur laden vapor from the storage tank means combines with the water in the eductor, the sulfur is combined with the water and can be sent to further processing to recover sulfur, e.g., sour water stripping.

In another embodiment of the present invention, the apparatus further comprises means for regulating the vapor pressure in the storage tank means within a given range of pressures. More specifically, the present regulating means involves a plug valve means associated with the vapor space of the storage tank means which is activated, e.g., opened, in response to unusually high and/or unusually low vapor pressures within the storage tank means. That is, the plug valve means will open in the event the vapor pressure within the storage tank means exceeds a predetermined maximum and/or falls below a predetermined minimum. Thus, when the vapor pressure in the storage tank means increases beyond the predetermined maximum, the plug valve means will open to provide for emergency removal of an amount of vapor from the storage tank means. Because this valve means operates in response to the vapor pressure in the storage tank means, as the vapor pressure in the storage tank falls to within the desired range, the valve means will close. Similarly, if the vapor pressure in the storage tank falls below a predetermined minimum, the plug valve means will open to allow gas, e.g., atmospheric gas, to enter the storage tank thereby increasing the vapor pressure in the storage tank means. As the vapor pressure builds to within the desired range, the plug valve means will close.

In normal operations, the storage tank means operates such that the plug valve means last described remains closed and the vapor pressure within the storage tank means is maintained within the predetermined maximum and minimum through the use of the eductor means previously described. As the vapor pressure increases, the amount of water fed to the eductor means is increased thereby increasing the amount of vapor removed from the storage tank means. Conversely, as the vapor pressure in the storage tank means decreases, the amount of water sent to the eductor means is decreased thereby decreasing the amount of vapor removed from the storage tank means. In unusual or upset conditions, the eductor means may not have sufficient capacity to maintain the vapor pressure in the storage tank means within the desired range. In this event, the plug valve means will act as described above to maintain the vapor pressure in the storage tank within the desired limits.

In a preferred embodiment, the plug valve means comprises a tapered plug associated with an orifice communicating with the vapor space of the storage tank means, the orifice being of a size and made of a material compatible with the plug. The plug is moveable in and out of the orifice in response to the vapor pressure within the storage tank means. By "compatible" is meant that the construction materials of the plug and orifice are such that when the plug is positioned within the orifice a substantially vapor-tight seal is obtained essentially without damaging either the plug or orifice. Such construction has been found to be relatively maintenance free and be capable of opening and closing several times without collecting undue amounts of crystallized molten material, e.g., sulfur, on the plug to prevent proper seating, e.g., positioning within the orifice, of the plug. In a more preferred embodiment, the plug is at least partially constructed of a polymeric material, such as polytetrafluoroethylene.

These and other aspects and advantages of the present invention are set forth in the following detailed description and claims, particularly when considered in conjunction with the accompanying drawing in which like parts bear like reference numerals.

In the drawing:

FIG. 1 is a simplified schematic view of one embodiment of the apparatus of the present invention.

Referring now to the drawing, a sulfur storage tank, shown generally as 10, is equipped with sulfur inlet line 12 and sulfur outlet line 14. Steam from lines 16 and 18 is admitted to storage tank 10 and steam condensate leaves storage tank 10 via lines 20 and 22. Heat from the steam in lines 16 and 18 is transferred to the molten sulfur in storage tank 10 to maintain this sulfur in the molten state. Storage tank 10 also includes a vapor space 24 the size of which depends on the level 26 of molten sulfur with storage tank 10. Steam from valved line 28 enters the vapor space 24 at a controlled rate to provide additional heat to the molten sulfur within storage tank 10 and to help maintain the proper vapor pressure within storage tank 10.

The amount of steam which flows through line 28 is controlled by control valve 30. Control valve 30 acts in response to pressure indicating controller 32 which, in turn, receives a signal from pressure transmitter 34. The input to pressure transmitter 34 is the vapor pressure from the vapor space 24 of storage tank 10. In other words, the amount of steam flowing through line 28, e.g., into vapor space 24 of storage tank 10, is controlled by the vapor pressure within storage tank 10.

Line 36 between vapor space 24 and pressure transmitter 34 is provided with an continuous steam purge via line 38 so as to insure that pressure transmitter 34 receives the correct vapor pressure.

Storage tank 10 is further provided with vapor removal line 40 which provides fluid communication between the vapor space 24 of storage tank 10 and the water powered eductors 42 and 44. The sulfur-laden vapor in line 40 is split into two streams, one continuing to flow in line 40 and the other flowing in line 41, before the vapor flows through the eductors 42 and 44. Water is supplied to the eductors 42 and 44 through line 46. The amount of water which flows to the eductors 42 and 44 is controlled by valve 48. Valve 48 opens and closes in response to pressure indicating controller 32 which acts as described previously. Thus, the amount of water flowing to eductors 42 and 44 through lines 46 and 47 is controlled by and dependent on the vapor pressure within storage tank 10. Sulfur-laden vapor lines 40 and 41 do not have any control valves along their paths. Thus, these vapor lines 40 and 41 can be properly and uniformly insulated to avoid sulfur crystallization. The amount of sulfur-laden vapor flowing through lines 40 and 41 is controlled by the amount of water flowing to eductors 42 and 44 through lines 46 and 47.

The sulfur-containing waters from eductors 42 and 44 are combined in line 50 and removed for further processing, e.g., sour water stripping. Additional water from line 52 may be added to the water in line 50 if desired.

In normal operation, the action of the eductors 42 and 44 are sufficient to control the vapor pressure in storage tank 10 within desired limits. However, in unusual circumstances the vapor pressure in storage tank 10 exceeds the bounds, either high or low, within which the eductors 42 and 44 can control. In these instances, another control mechanism is employed.

Storage tank 10 is equipped with a man way 54 which includes an upward extending hole 56. Under normal operating conditions, tapered polytetrafluoroethylene plug 58 is seated in hole 56 and forms a substantially vapor tight seal with the walls of hole 56. However, when the vapor pressure within storage tank 10 either falls below or builds up beyond predetermined limits, plug 58 is made to unseat from hole 56 to allow either sulfur laden vapor to escape storage tank 10 or to allow atmospheric gas to enter storage tank 10 thereby bringing the vapor pressure in storage tank 10 within predetermined limits.

Plug 58 is caused to unseat from hole 56 as follows. When the vapor pressure within storage tank 10 exceeds a predetermined limit, pressure transmitter 34 directs a signal to three-way pressure sensitive snap operating valve 60 which causes valve 60 to close. In so closing, the elevated pressure in line 62, between valve 60 and low signal selector 64 is reduced. Under these circumstances, three-way pressure sensitive snap operating valve 66 remains as under normal operating conditions, i.e., closed, and the pressure in line 68, between valve 66 and low signal selector 64 remains elevated. Low signal selector 64 selects the low pressure signal in line 62 and acts through line 70 to actuate valve mechanism 72 and unseat plug 58 thereby allowing vapors to exit storage tank 10 and reducing the vapor pressure in storage tank 10. As the vapor pressure in storage tank 10 comes down within limits, pressure transmitter 34 sends a signal to open valve 60. With valve 60 open, instrument air from line 74 is caused to flow into line 62 thereby eliminating the low pressure in line 62. This, in turn, deactivates valve mechanism 72 and plug 58 is reseated in hole 56. In order to insure proper reseating of plug 58 into hole 56, a small amount of hot gaseous media, e.g., steam, is preferably passed through the hole 56 to keep the hole 56 and plug 58 substantially free of crystallized molten material, e.g., sulfur.

When the vapor pressure within storage tank 10 is below a predetermined limit, pressure transmitter 34 directs a signal to three-way pressure sensitive snap operating valve 66 which causes valve 66 to open. In so opening, the elevated pressure in line 68 is reduced. Under these circumstances, valve 60 remains as under normal operations, i.e., open. Low signal selector 64 selects the low pressure signal in line 68 and acts through line 70 to actuate valve mechanism 72 and unseat plug 58 thereby allowing atmospheric gases to enter storage tank 10 and increasing the vapor pressure in storage tank 10. As the vapor pressure in storage tank 10 increases to within predetermined limits, pressure transmitter 34 sends a signal to close valve 66. With valve 66 closed, instrument air from line 76 flows into line 68, deactivating valve mechanism 72 and plug 58 is reseated.

Under normal operating conditions, the pressure in lines 62 and 68 is elevated and substantially equal and plug 58 remains seated in hole 56.

To protect against an extreme upset, e.g., beyond the design capacity of the eductors and regulating means, the storage tank 10 may also be equipped with conventional pressure relief valve 80 which, if opened, may require extensive cleaning before properly reseating.

The present invention provides for reliable storage of molten materials, such as sulfur. Under normal operating conditions, the liquid powered eductor system, controlled in response to the tank vapor pressure, provides effective venting of tank vapors. Reduced crystallization of the molten material in the vapor removal line is achieved. Under upset conditions, the present regulating means provides for a rapid return to normal conditions. The present system, whether under normal or upset conditions, is relatively maintenance free.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. An apparatus for storing molten materials comprising: a storage tank means for storing an amount of said molten material, said storage tank means having a vapor space above the level of said molten material; inlet and outlet means associated with said storage tank means to provide for access and egress of said molten material to and from said tank means, respectively; gaseous media supply means in fluid communication with said storage tank means for providing gaseous media to said storage tank means, the amount of gaseous media supplied being dependent on the vapor pressure within said storage tank means; vapor removal means providing for exit of vapor from said vapor space of said storage tank means; a liquid powered eductor means in fluid communication with said vapor removal means acting to urge vapors from said storage tank means through said vapor removal means; and a liquid supply means associated with said eductor means to provide liquid to power said eductor means, the amount of liquid being supplied by said source being controlled in response to the vapor pressure inside said storage tank means.

2. The apparatus of claim 1 wherein said molten material is sulfur, said gaseous media is steam and said liquid is water.

3. The apparatus of claim 1 wherein said apparatus further comprises regulating means for controlling the vapor pressure in said storage tank means within a predetermined range of pressures.

4. The apparatus of claim 3 wherein said regulating means comprises plug valve means associated with said vapor space of said storage tank means which is activated in response to the vapor pressure in said storage tank means being above a predetermined limit and/or being below a different predetermined limit.

5. The apparatus of claim 4 wherein said molten material is sulfur, said gaseous media is steam and said liquid is water.

6. An apparatus for storing molten materials comprising: a storage tank means for storing an amount of said molten material, said storage tank means having a vapor space above the level of said molten material; inlet and outlet means associated with said storage tank means to provide for access and egress of said molten material to and from said tank means, respectively; gaseous media supply means in fluid communication with said storage tank means for providing gaseous media to said storage tank means, the amount of gaseous media supplied being dependent on the vapor pressure within said storage tank means; and regulating means associated with said vapor space of said storage tank means which is activated in response to (1) the vapor pressure in said storage tank means being above a predetermined limit to allow vapor to exit said storage tank means and (2) the vapor pressure in said storage tank means being below a different predetermined limit to allow gas to enter said storage tank.

7. The apparatus of claim 6 wherein said regulating means comprises a plug valve means which is activated in response to the vapor pressure in said storage tank means.

8. The apparatus of claim 7 wherein said molten material is sulfur and said gaseous media is steam.

9. A method for removing molten material-containing vapor from a storage tank used to store molten material, said storage tank having a vapor space above the level of said molten material which method comprises:

passing molten material-containing vapor from said vapor space, said passing being under the influence of a liquid powered eductor, the amount of said liquid to said eductor being controlled in response to the vapor pressure in said storage tank.

10. The method of claim 9 wherein said molten material is sulfur, said liquid is water and said vapor contains steam.

11. The method of claim 10 which further comprises controlling the vapor pressure within said storage tank above a predetermined minimum and below a predetermined maximum by providing valve means in communication with said storage tank vapor space, which valve means opens in response to said vapor pressure when said vapor pressure is above said maximum or below said minimum.

12. A method for controlling the vapor pressure in a storage tank used to store molten materials within a predetermined range, said storage tank having a vapor space, which comprises providing at least one valve in communication with said storage tank vapor space opening in response to said vapor pressure (1) when said vapor pressure is above a predetermined maximum vapor pressure thereby causing molten material-containing vapors to exit said storage tank to reduce said vapor pressure and (2) when said vapor pressure is below a predetermined minimum vapor pressure thereby causing gas to enter said storage tank to increase said vapor pressure.

13. The method of claim 12 wherein said molten material is sulfur and said vapor contains steam.

14. The method of claim 13 wherein a single valve is provided.

* * * * *